(12) United States Patent
Jirgal

(10) Patent No.: US 6,751,695 B1
(45) Date of Patent: Jun. 15, 2004

(54) BUS BRIDGE DEVICE FOR ADVANCED MICROCONTROLLER BUS ARCHITECTURE (AMBA) ADVANCED SYSTEM BUS (ASB) PROTOCOL

(75) Inventor: James J. Jirgal, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/261,005

(22) Filed: Mar. 2, 1999

(51) Int. Cl.[7] .............................................. G06F 13/00
(52) U.S. Cl. ........................ 710/305; 710/306; 710/313
(58) Field of Search ................................ 710/129, 126, 710/127, 305, 306, 313

(56) References Cited

U.S. PATENT DOCUMENTS

| | | | |
|---|---|---|---|
| 5,659,718 A | * | 8/1997 | Osman et al. ............... 713/400 |
| 5,761,462 A | * | 6/1998 | Neal et al. ................... 710/129 |
| 5,835,738 A | * | 11/1998 | Blackledge, Jr. et al. ... 710/127 |
| 5,842,038 A | * | 11/1998 | Williams et al. ............... 710/5 |

* cited by examiner

*Primary Examiner*—Tim Vo
(74) *Attorney, Agent, or Firm*—Peter Zawilski

(57) ABSTRACT

A bus bridge device for enabling communication between a first device and a second device, wherein the first device is based on advanced microprocessor bus advanced system bus (ASB) protocol and the second device is based on peripheral component interconnect (PCI) protocol. The bus bridge device includes an ASB protocol interface coupled to the ASB protocol device, and the ASB protocol interface is adapted to transmit a response to and receive a transaction from the ASB protocol device. The bus bridge device also includes a PCI protocol interface coupled to the PCI protocol device, and the PCI protocol interface is adapted to transmit a transaction to and receive a response from the PCI protocol device. The ASB protocol interface is coupled to the PCI protocol interface. The ASB protocol interface is adapted to forward the transaction from the ASB protocol device to the PCI protocol interface, and the PCI protocol interface is adapted to forward the response from the PCI protocol device to the ASB protocol interface.

22 Claims, 6 Drawing Sheets

BUS BRIDGE DEVICE FOR ADVANCED MICROCONTROLLER BUS ARCHITECTURE (AMBA) ADVANCED SYSTEM BUS (ASB) PROTOCOL

TECHNICAL FIELD

The present invention pertains to the field of computer system architecture. More specifically, the present invention pertains to a bus bridge device incorporated into a computer system.

BACKGROUND ART

Electronic devices such as lap top computers, calculators, palm tops, and the like are common means of increasing productivity and reducing costs in most professional and personal activities. These devices are made up of a variety of individual components that are required to smoothly and efficiently interact with each other. In addition, the electronic devices themselves are required to smoothly and efficiently interact with each other and with other peripheral devices.

In the prior art, as the state of the art evolves and new protocols are developed, a component or device is designed to operate according to a specific protocol—for example, the newest protocol or the protocol best suited to the component's intended application. Typically, the component or device can then operate only according to a single protocol. As a consequence, a device or component operating in accordance with one protocol is not able to communicate with another device or component operating in accordance with a different protocol.

The standard protocol commonly used in many devices is the peripheral component interconnect (PCI) protocol. These PCI devices can only communicate with other devices that use the PCI protocol.

Another protocol that is commonly used and growing in popularity is the Advanced Microcontroller Bus architecture (AMBA) Advanced System Bus (ASB) protocol. The ASB protocol is utilized by the Advanced RISC Microprocessor (ARM processor). Many devices use the ARM processor because it is small and energy-efficient, and thus excellent for battery-powered devices such as those mentioned above (e.g., lap tops, palm tops, and the like). These devices also incorporate devices or components that are based on ASB protocol and connected to the ARM processor via an ASB.

Therefore, a problem in the prior art is that PCI devices and ASB devices are not able to communicate with each other because they use different protocols.

A bridge device is one means of enabling communication between devices or components that operate according to different protocols. A bridge device generally functions by translating a transaction (e.g., a command, a request, data transfer, or a similar operation) from a first device into the protocol of the second device, and then translating the response back into the protocol used by the first device.

However, a problem with bridge devices is that they are complex, requiring a number of gates. Bus bridge devices are also difficult to simulate and design.

Thus, a need exists for a device or method that would enable PCI devices and ASB devices to exist in the same system and communicate with each other. A further need exists for a device or method that satisfies the above need, and also permits sufficient flexibility to accommodate multiple standard buses and effective utilization of master and slave devices in the design of the system architecture.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a device and method that enable PCI devices and ASB devices to exist in the same system and communicate with each other. The present invention also provides a device and method that permit sufficient flexibility to accommodate multiple standard buses and effective utilization of master and slave devices in the design of the system architecture.

The present invention is a bus bridge device for enabling communication between a first device and a second device, wherein the first device is based on Advanced System Bus (ASB) protocol and the second device is based on peripheral component interconnect (PCI) protocol. The bus bridge device includes an ASB protocol interface coupled to the ASB protocol device, and the ASB protocol interface is adapted to transmit a response to and receive a transaction from the ASB protocol device. The bus bridge device also comprises a PCI protocol interface coupled to the PCI protocol device, and the PCI protocol interface is adapted to transmit a transaction to and receive a response from the PCI protocol device. The ASB protocol interface is coupled to the PCI protocol interface. The ASB protocol interface is adapted to forward the transaction from the ASB protocol device to the PCI protocol interface, which executes that transaction on the PCI bus, and the PCI protocol interface is adapted to forward the response from the PCI protocol device to the ASB protocol interface, which in turn executes that transaction on the ASB bus.

In the present embodiment, the ASB protocol device is an Advanced RISC Microprocessor (ARM processor) coupled to the bus bridge device. The, ARM processor is coupled to the ASB bus. In this embodiment, the PCI protocol device is coupled to the bus bridge device via a PCI protocol bus.

In the present embodiment, the bus bridge device is a uni-directional bridge (e.g., for applications in which PCI devices are slave devices only). The uni-directional embodiment effectively supports a number of computer system architectures utilizing master and slave devices and consisting of multiple standard buses and does not require the use of a complex, bi-directional bridge. Thus, in the present embodiment, the bus bridge device includes fewer components (e.g., gates), is easier to simulate and design, and is therefore less costly. Transactions originate on only one of the buses and are forwarded to the opposite bus. Responses originate on the opposite bus and are forwarded to the originating bus.

The present invention also supports a bi-directional bridge device if one is required (e.g., for applications in which PCI devices are master devices which require access to devices on the ASB bus). In the bi-directional embodiment, the bus bridge device comprises a second ASB protocol interface coupled to the ASB protocol device, and the second ASB protocol interface is adapted to transmit a transaction to the ASB protocol device. In this embodiment, the bus bridge device also comprises a second PCI protocol interface coupled to the PCI protocol device, and the second PCI protocol interface is adapted to receive a transaction from the PCI protocol device. The second ASB protocol interface is coupled to the second PCI protocol interface. The second ASB protocol interface is adapted to translate a forwarded transaction from the second PCI protocol interface to the ASB protocol, and the second PCI protocol interface is adapted to forward a PCI transaction on the PCI bus to the second ASB protocol interface. Thus, in this embodiment, full peer-to-peer communication between ASB and PCI protocol devices and buses is allowed. Thus, in this embodiment, both the PCI protocol bus and the ASB protocol bus may attach master devices as well as slave devices.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
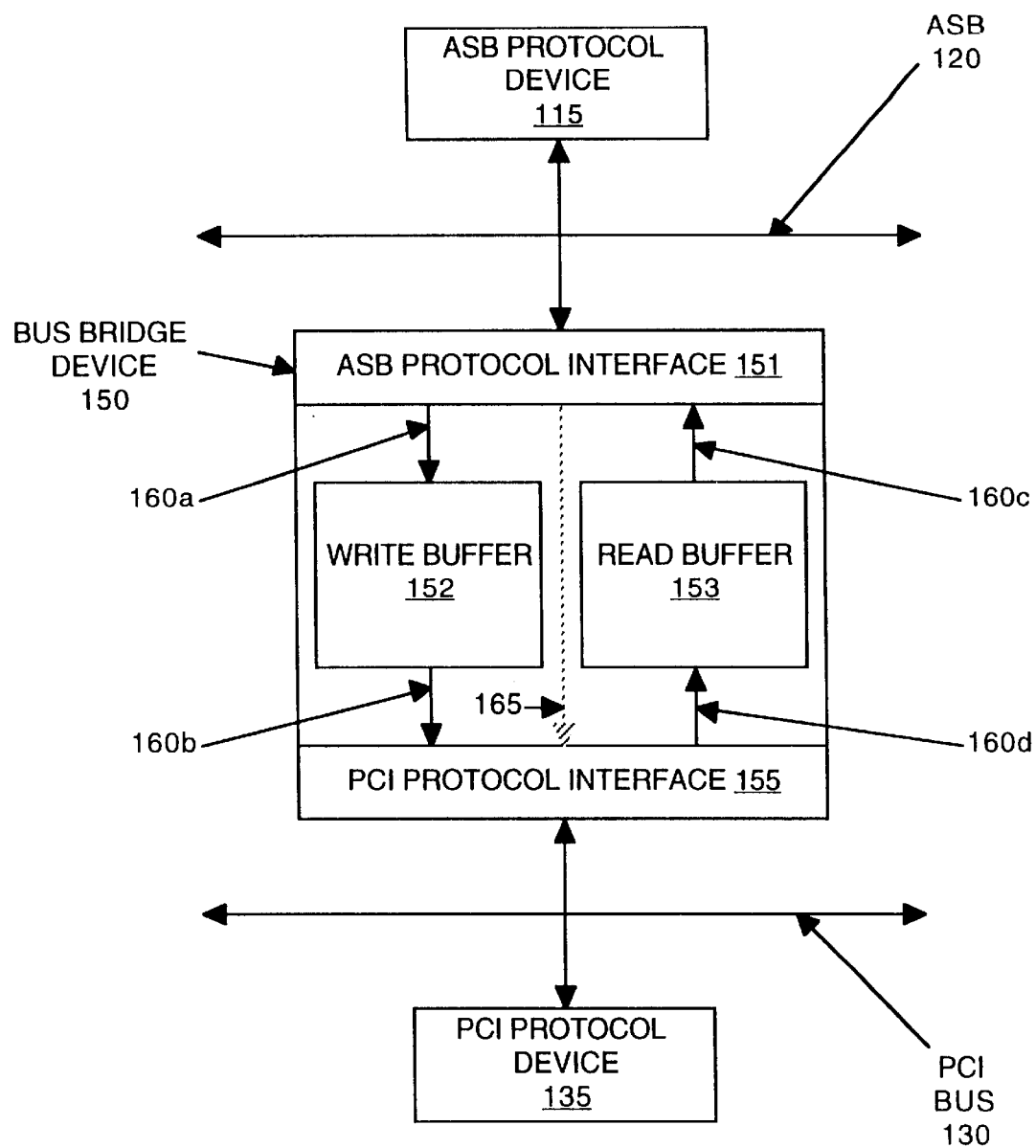
FIG. 1 is a block diagram of a uni-directional bus bridge device for translating between ASB protocol and PCI protocol in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

The present invention is a bus bridge device and method that enables communication between a first device, where the first device is based on Advanced Microcontroller Bus architecture (AMBA) Advanced System Bus (ASB) protocol, and a second device, where the second device is based on peripheral component interconnect (PCI) protocol.

FIG. 1 is a block diagram of one embodiment of bus bridge device 150 used for translating a transaction between ASB protocol and PCI protocol in accordance with the present invention. In FIG. 1, solid arrows 160a–160d indicate the direction of data flow, and dashed arrow 165 indicates the direction of transaction flow.

In this embodiment, bus bridge device 150 comprises an ASB protocol interface 151, write buffer 152, read buffer 153, and PCI protocol interface 155. ASB protocol interface 151 is coupled to write buffer 152 and read buffer 153, each of which in turn are also coupled to PCI protocol interface 155. In this embodiment, bus bridge device 150 is coupled to ASB protocol device 115 via ASB protocol bus 120, and bus bridge device 150 is coupled to PCI protocol device 135 via PCI bus 130. It is understood that the present invention will function with more than one ASB protocol device and/or more than one PCI protocol device.

Continuing with reference to FIG. 1, bus bridge device 150 permits ASB protocol device 115 to communicate with PCI protocol device 135. ASB protocol interface 151 is compliant with ASB protocol and is adapted to recognize and transmit transactions between ASB protocol device 115, write buffer 152 and read buffer 153. PCI protocol interface 155 is compliant with PCI protocol and is adapted to recognize and transmit transactions between write buffer 152, read buffer 153 and PCI protocol device 135.

Bus bridge device 150 also permits PCI protocol device 135 to communicate with ASB protocol device 115. PCI protocol interface 155 is adapted to recognize and transmit transactions between PCI protocol device 135 and read buffer 153. ASB protocol interface 151 is adapted to recognize and transmit transactions between read buffer 153 and ASB protocol device 115.

Continuing with reference to FIG. 1, write buffer 152 and read buffer 153 provide a storage capacity that permits data and other transaction information to be collected, collated and forwarded at the appropriate time. Write buffer 152 and read buffer 153 may be established to be of any size depending on the requirements associated with the application of bus bridge device 150. Also, although two separate buffers are depicted, the present invention is well suited for use with different buffer configurations.

In this embodiment, write buffer 152 and read buffer 153 handle transactions using a first-in first-out (FIFO) process. That is, for example, write data from an ASB write transaction from ASB protocol device 115 are stored in write buffer 152 until bus bridge device 150 arbitrates for control of PCI bus 130. After the transaction data have been gathered and stored, and control of PCI bus 130 is granted, the data are forwarded to PCI protocol device 135. Write buffer 152 is thereby emptied and is ready for the block of data associated with the next transaction. Similarly, read data from an ASB read transaction from PCI protocol device 135 are stored in read buffer 153 until ASB protocol device 115 indicates that it is ready to receive the read data, at which time the data are forwarded to ASB protocol device 115. Read buffer 153 is thereby emptied and is ready for the block of data associated with the next transaction.

With reference still to FIG. 1, in this embodiment, bus bridge device 150 is a uni-directional bus bridge device between ASB protocol device 115 and PCI protocol device 135. That is, only ASB protocol device 115 can read or write information across bus bridge device 150. Thus, in this embodiment, ASB protocol device 115 is an ASB master device and ASB protocol interface 151 is an ASB slave device, and PCI protocol device 135 is a PCI slave device and PCI protocol interface 155 is a PCI initiator. The ASB slave device functions to forward a transaction from an ASB master device to the PCI initiator. The PCI initiator executes the transaction via the PCI bus in order for the appropriate PCI slave device to respond.

The uni-directional embodiment is less complex (e.g., fewer gates) and is thus easier to simulate and design. It is also less costly because it requires less silicon surface area. However, if the use of PCI master devices is desired, a bi-directional embodiment of the present invention is also supported.

Figure 2:
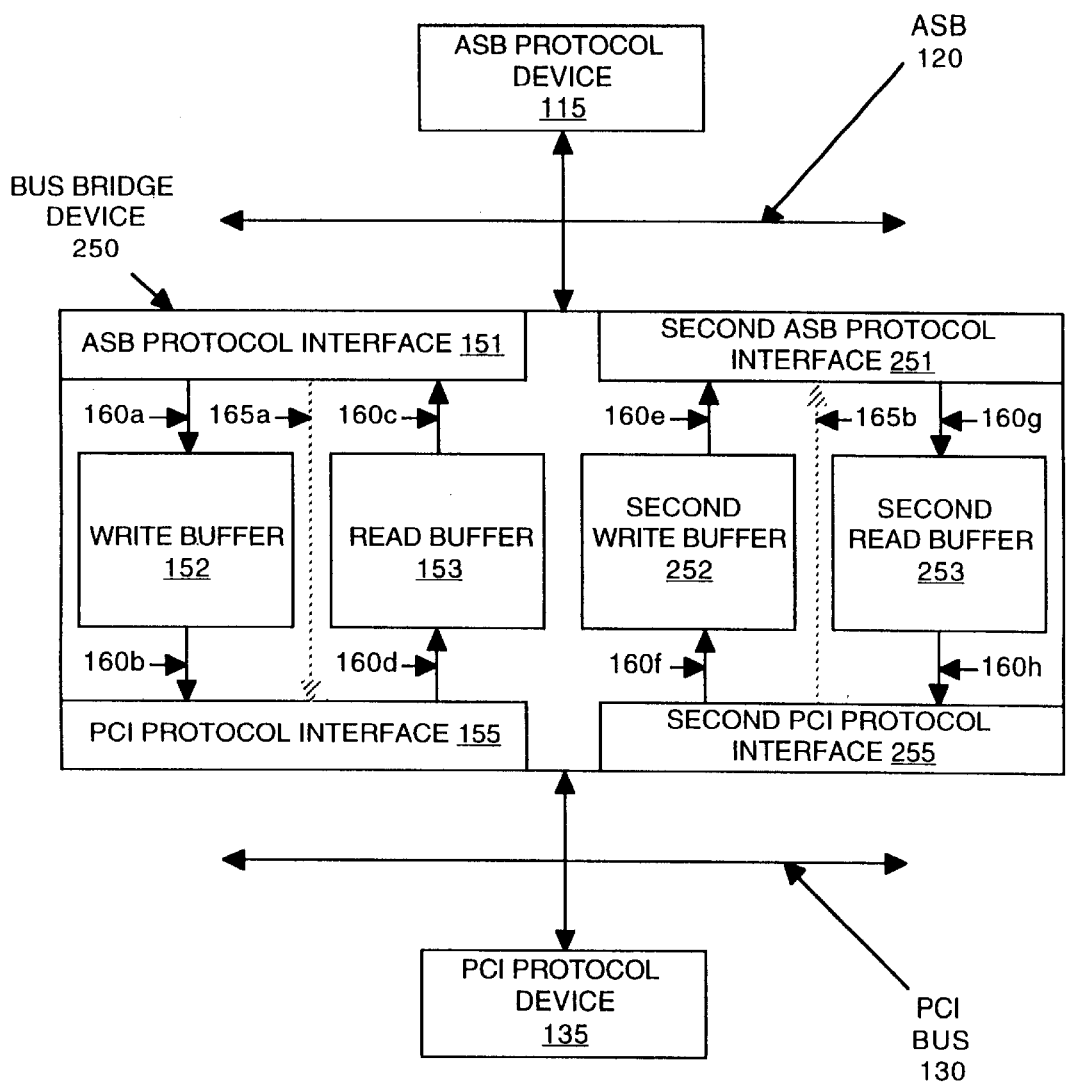
FIG. 2 is a block diagram of a bi-directional bus bridge device for translating between ASB protocol and PCI protocol in accordance with one embodiment of the present invention.

FIG. 2 illustrates an embodiment of the present invention in which bus bridge device 250 is bi-directional. In FIG. 2, solid arrows 160a–160h indicate the direction of data flow, and dashed arrows 165a–165b indicate the direction of transaction flow.

In this embodiment, in addition to the components described above in conjunction with FIG. 1, bus bridge device 250 includes second ASB protocol device 251, second write buffer 252, second read buffer 253, and second PCI protocol interface 255. The arrangement of these additional components are the same as for their parallel components that are described above. However, these additional components permit bus bridge device 250 to function as a bi-directional bridge. Thus, in this embodiment, both ASB protocol device 115 and PCI protocol device 135 can initiate a transaction, and master and/or slave devices may be attached to both ASB 120 and PCI bus 130.

In the bi-directional embodiment, bus bridge device 250 comprises second ASB protocol interface 251 coupled to ASB protocol device 115, and second ASB protocol interface 251 is adapted to transmit a transaction to ASB protocol device 115. In this embodiment, bus bridge device 250 also comprises second PCI protocol interface 255 coupled to PCI protocol device 135, and second PCI protocol interface 255 is adapted to receive a transaction from PCI protocol device 135. Second ASB protocol interface 251 is coupled to second PCI protocol interface 255. Second ASB protocol interface 251 is adapted to translate a forwarded transaction from second PCI protocol interface 255 to the ASB protocol, and second PCI protocol interface 255 is adapted to forward a PCI transaction on PCI bus 130 to second ASB protocol interface 251. Thus, in this embodiment, full peer-to-peer communication between ASB and PCI protocol devices and buses is allowed. Thus, in this embodiment, both the PCI protocol bus and the ASB protocol bus may attach master devices as well as slave devices.

In the bi-directional embodiment, ASB protocol interface 151 is an ASB slave device, PCI protocol interface 155 is a PCI initiator, second ASB protocol interface 251 is an ASB master device, and second PCI protocol interface 255 is a PCI target. The ASB slave device functions to forward a transaction from an ASB master device to the PCI initiator. The PCI initiator on the bus bridge device executes the transaction via the PCI bus in order for the appropriate PCI slave device to respond. Similarly, a PCI initiator on the PCI bus addresses the PCI target on the bus bridge device for transactions that target any slave device on the ASB. The PCI target of the bus bridge device forwards the transaction to the ASB master device of the bus bridge device.

With reference still to FIG. 2, bi-directional bus bridge device 250 allows for the simultaneous execution of ASB and PCI transactions on the respective bus. Hence, in this embodiment, the control logic of the present invention bus bridge device supports simultaneous transactions passing from one interface to the other in both directions and prevents a deadlock condition from occurring. For example, a deadlock condition can occur when ASB protocol device 115 is attempting to access PCI protocol device 135 while PCI protocol device 135 is in the process of reading or writing data to or from memory (not shown). In this case, the control logic of bus bridge device 250 can, for example, temporarily stop the ASB transaction until the PCI protocol device 135 is finished reading or writing data to or from memory. Note that a deadlock condition cannot occur with the uni-directional bus bridge device depicted by FIG. 1 because only a single transaction can occur at any particular time.

Figure 3:
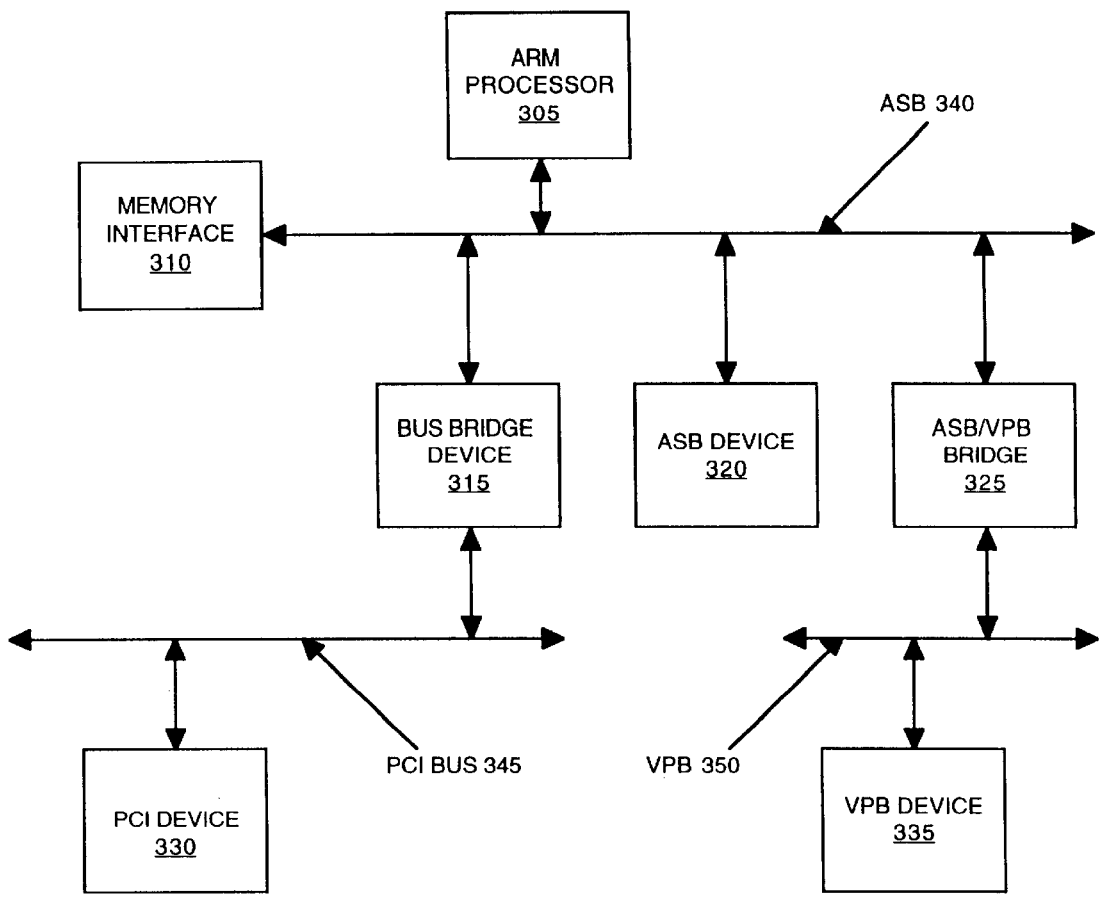
FIG. 3 is a block diagram of one computer system architecture utilizing a bus bridge device in accordance with the present invention.

With reference now to FIG. 3, one system architecture incorporating the present invention bus bridge device is illustrated. In this embodiment, ASB protocol device 115 of FIGS. 1 and 2 is Advanced RISC Microprocessor (ARM processor) 305. ARM processor 305 utilizes ASB protocol and is connected to memory interface 310 through ASB 340. ASB device 320 utilizes ASB protocol and is also connected to ASB 340. PCI bus 345 is connected to ASB 340 using the present invention bus bridge device 315, and PCI device 330 is coupled to PCI bus 345. As discussed above, bus bridge device 315 can be either uni-directional or bi-directional, and so PCI device 330 may be either a slave device or a master device, respectively. Thus, by using bus bridge device 315 to bridge between ASB 340 and PCI bus 345, a PCI protocol device (PCI device 330) can communicate with an ASB protocol device (ARM processor 305 and ASB device 320) and also can communicate with memory interface 310 via an ASB protocol bus (ASB 340), and vice versa. It is understood that the present invention bus bridge device may be used with more than one PCI device.

Continuing with reference to FIG. 3, VLSI peripheral bus (VPB) 350 is connected to ASB 340 through ASBNPB bridge 325, and VPB device 335 is coupled to VPB 350 so that it can be accessed through ASB 340 by the ARM processor 305. In addition, ASB device 320 and VPB device 335 can be accessed by PCI device 330, although typically a PCI device communicates only with the computer system memory via memory interface 310. Although a single ASB device and a single VPB device are shown, the present invention may be utilized with any combination of any number of ASB and VPB devices.

The system architecture of FIG. 3 is advantageous in that it allows a simple approach for connecting one or more PCI devices to an AMBA-based system. This architecture is employed with the uni-directional embodiment of the present invention when the PCI devices are slave devices. The uni-directional embodiment is comprised of fewer components (e.g., gates) and is thus easier to simulate and design. It is also less costly because it requires less silicon surface area. If the use of PCI master devices is desired, the bi-directional embodiment of the present invention is also supported.

Figure 4:
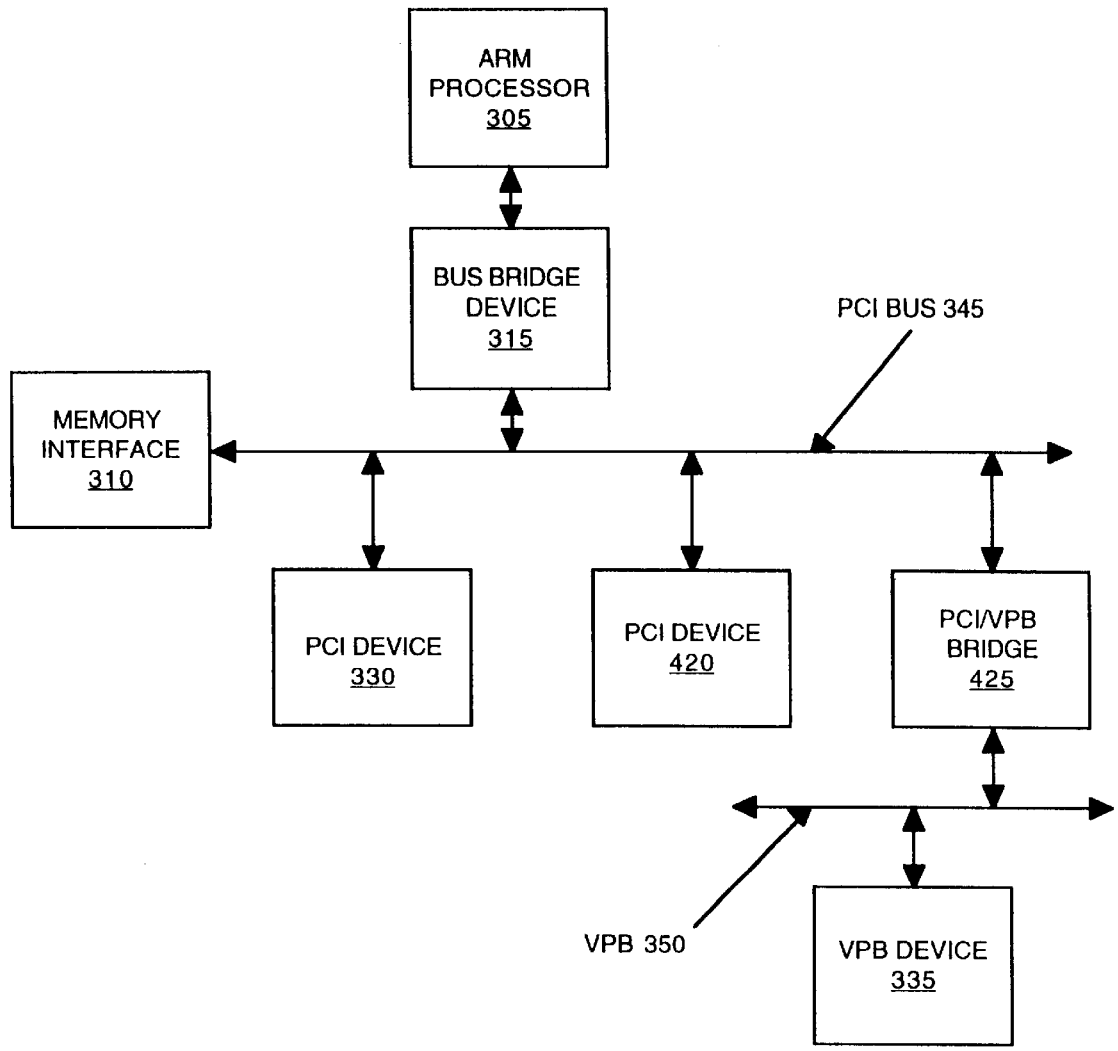
FIG. 4 is a block diagram of a second computer system architecture utilizing a bus bridge device in accordance with the present invention.

With reference next to FIG. 4, another system architecture incorporating the present invention bus bridge device is shown. In this embodiment, ASB protocol device 115 (FIGS. 1 and 2) is ARM processor 305. ARM processor 305 incorporates an internal ASB coupled to bus bridge device 315. Therefore, ARM processor 305 can communicate with memory interface 310 through PCI bus 345, and also with PCI devices 330 and 420. Thus, by using bus bridge device 315 to bridge between ARM processor 305 and PCI bus 345, an ASB protocol device (ARM processor 305) can communicate with memory interface 310 via a PCI protocol device (PCI bus 345), and vice versa. It is understood that the present invention bus bridge device may be used with a different number of PCI devices than that shown by FIG. 4.

With reference still to FIG. 4, VPB bus 350 is connected to PCI bus 345 through PCINPB bridge 425, and VPB device 335 is coupled to VPB 350 so that it can be accessed through PCI bus 345 by the ARM processor 305. In addition, VPB device 335 can be accessed by PCI devices 330 and 420. It is understood that the present invention bus bridge device may be utilized with any number of VPB devices.

The system architecture of FIG. 4 is advantageous because it facilitates integrating an ASB device with a PCI system. In this architecture, the uni-directional embodiment of the present invention is utilized. The uni-directional embodiment is comprised of fewer components (e.g., gates) and is thus easier to simulate and design. It is also less costly because it requires less silicon surface area.

Figure 5:
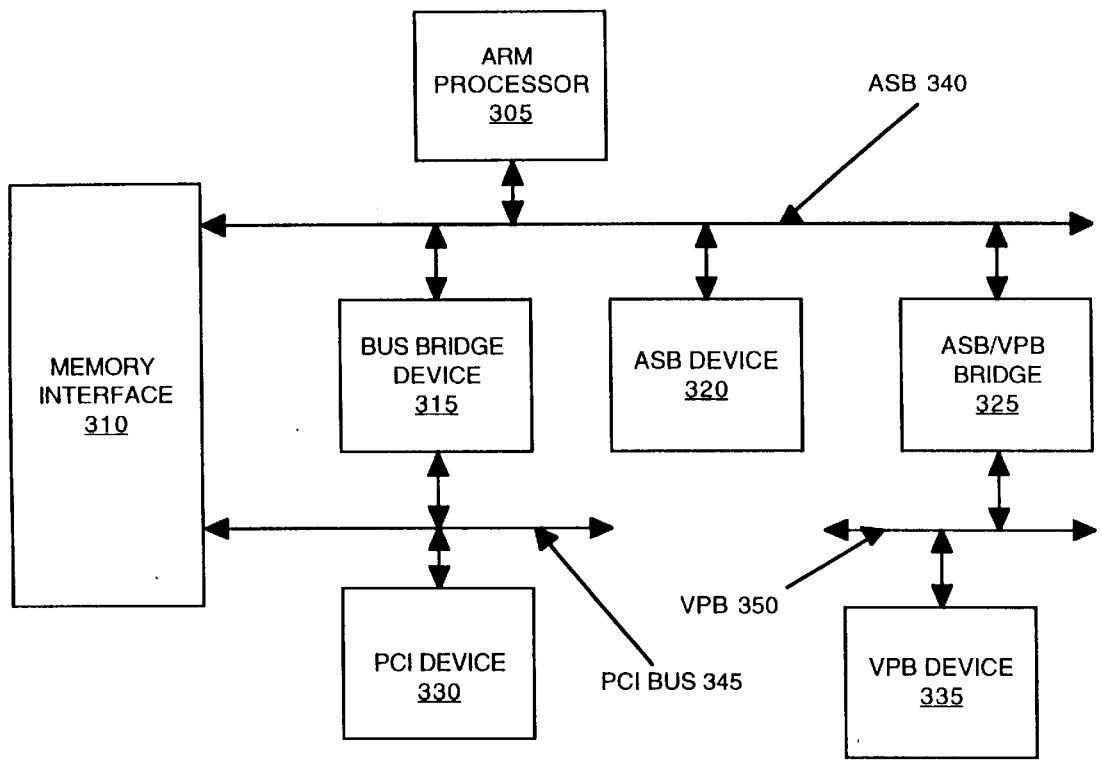
FIG. 5 is a block diagram of a third computer system architecture utilizing a bus bridge device in accordance with the present invention.

With reference next to FIG. 5, another system architecture incorporating the bus bridge device of the present invention is shown. In this embodiment, ARM processor 305 is connected to memory interface 310 through ASB 340, and PCI device 330 is also connected to memory interface 310 through a separate port via PCI bus 345. ASB 340 is connected to PCI bus 345 through the present invention bus bridge device 315. ASB device 320 is also be connected to ASB 340. Hence, by using bus bridge device 315 to bridge between ASB 340 and PCI bus 345, a PCI protocol device (PCI device 330) can be accessed by an ASB protocol device (ARM processor 305 and ASB device 320) (in the uni-directional embodiment), and vice versa (in the bi-directional embodiment).

The system architecture exemplified by FIG. 5 is advantageous because it permits the use of the uni-directional embodiment of the present invention while also providing further advantages over other architectures (for example, this architecture potentially doubles memory bus utilization). PCI master devices typically only target the main memory (not shown) through memory interface 310, so this architecture provides a direct connection from each PCI device to memory interface 310 through PCI bus 345. Thus, in this case, bus bridge device 315 only needs to be uni-directional. The uni-directional embodiment is comprised of fewer components (e.g., gates) and is thus easier to simulate and design. It is also less costly because it requires less silicon surface area. Note that, if an ASB device needs to be accessed by a PCI master device, the bi-directional embodiment of the present invention is also supported.

Continuing with reference to FIG. 5, VPB bus 350 is connected to ASB 340 through ASBNPB bridge 325, and VPB device 335 is coupled to VPB 350 so that it can be accessed through ASB 340 by ARM processor 305. In addition, ASB device 320 and VPB device 325 can be accessed by PCI device 330. It is understood that the present invention bus bridge device may be used with more than one PCI device and with any combination of any number of ASB and VPB devices.

FIGS. 3, 4 and 5 provide diagrams of three possible system architectures incorporating the present invention bus bridge device; however, it is understood that the present invention is not limited to the architectures shown.

Figure 6:
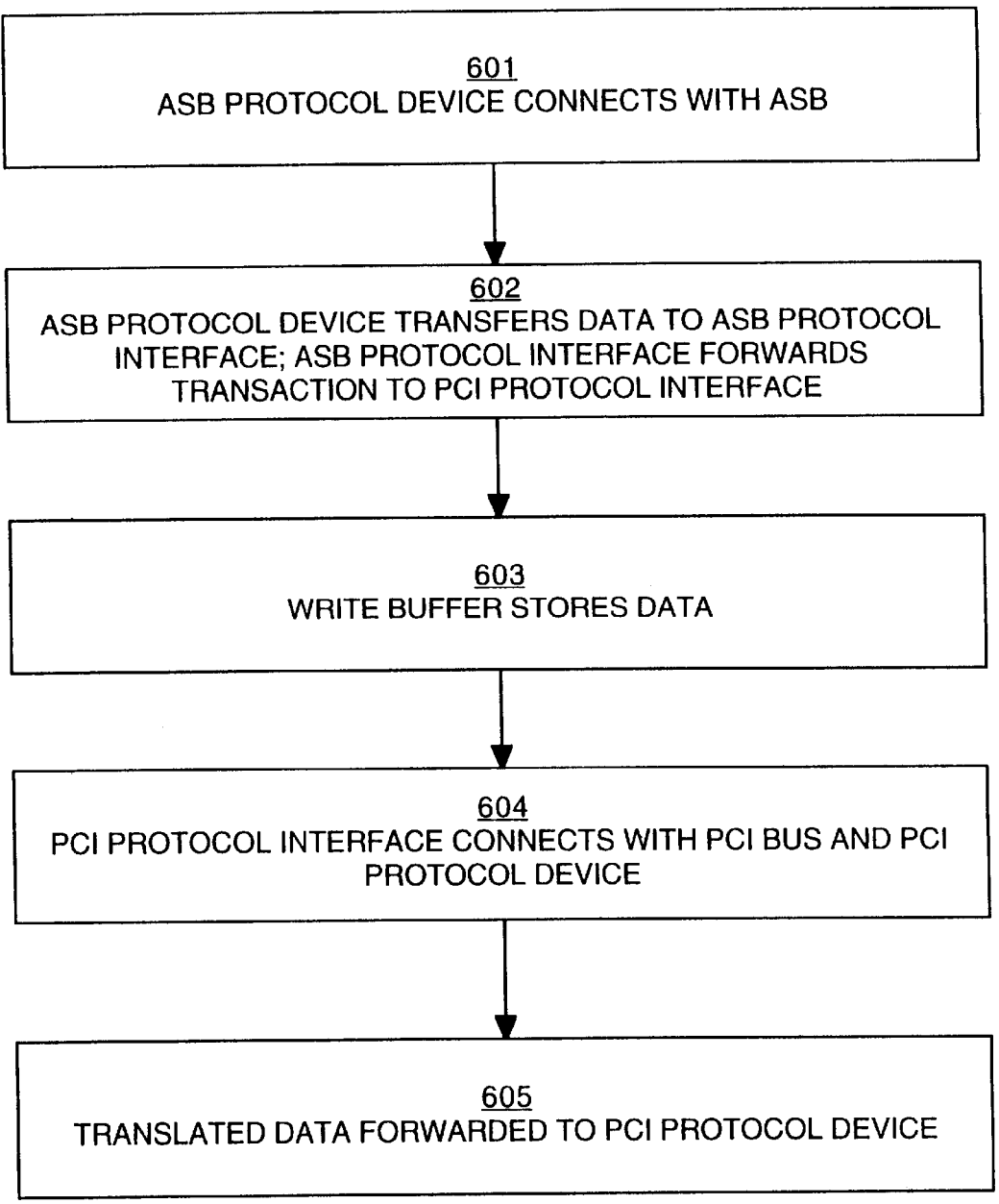
FIG. 6 is a flow chart of a process for translating between ASB protocol and PCI protocol implemented by a bus bridge device in accordance with the present invention.

With reference now to FIG. 6 and also back to FIGS. 1 and 2, a flowchart is provided of process 600 implemented by the present invention bus bridge device (e.g., uni-directional bus bridge device 150 and bi-directional bus bridge device 250). Process 600 exemplifies the case in which ASB protocol device 115 initiates the transaction. As will be seen, the process is in essence the same for other cases, such as the case where PCI device 135 responds to ASB protocol device 115 or the case where PCI device 135 initiates a transaction.

In step 601, ASB protocol device 115 makes a connection with ASB protocol interface 151 via either an external ASB or an internal bus located within ASB protocol device 115. ASB protocol device 115 arbitrates for control of ASB 120. Once control is granted, then ASB protocol device 115 is able to connect with ASB protocol interface 151. As discussed above, ASB protocol device 115 may be an ARM processor or an ASB device.

In step 602, ASB protocol device 115 transfers data representing, for example, a computer system operation such as a read or write command to ASB protocol interface 151 of bus bridge device 150 or 250. The data being transferred may represent the entire set of data associated with the command, or else it may represent only a first portion of the data, with additional portions being forwarded in subsequent transactions. ASB protocol interface 151 forwards the transaction to PCI protocol interface 155 and transmits the data to write buffer 152 for write commands. Read commands are forwarded as a read cycle to be executed on the PCI bus by PCI protocol interface 155. The read data returned on PCI protocol interface 155 is loaded into read buffer 153.

In step 603, write buffer 152 stores the data. By employing a buffer at this stage of the process, it is not necessary for PCI protocol interface 155 to be connected to PCI protocol device 135 at the same time that ASB protocol device 115 is connected to ASB protocol interface 151, thereby facilitating the communication process between these devices without having to monopolize ASB 120 and PCI bus 130 for an extended period of time.

In step 604, PCI protocol interface 155 arbitrates for control of PCI bus 130. Once control is granted, then PCI protocol interface 155 and PCI protocol device 135 are able to connect.

In step 605, once the connection between PCI protocol interface 155 and PCI protocol device 155 is made, the translated data are forwarded from write buffer 152 to PCI protocol device 135.

In a manner similar to that described above in conjunction with FIG. 6, PCI protocol device 135 is able to respond to ASB protocol device 115. That is, PCI protocol device 135 indicates it is ready to complete a read transaction, then forwards a block of data to PCI protocol interface 155. PCI protocol interface 155 translates the data from PCI protocol to ASB protocol and forwards the data to read buffer 153. Read buffer 153 stores the data until ASB protocol interface 151 and ASB protocol device 115 are able to complete the read transaction on ASB 120.

As explained previously herein, in one embodiment the bus bridge device is uni-directional (e.g., bus bridge device 150 of FIG. 1), in which case only ASB protocol device 115 can initiate a transaction. In another embodiment, the bus bridge device is bi-directional (e.g., bus bridge device 250 of FIG. 2), in which case both ASB protocol device 115 and PCI protocol device 135 can initiate a transaction.

With reference again to FIG. 6 and also back to FIG. 2, in the bi-directional embodiment of the present invention, the process for communicating between ASB protocol device 115 and PCI protocol device 135 is similar to process 600; however, if PCI protocol device 135 initiates a transaction, the flow of data is through second PCI protocol interface 255, second write buffer 252 or second read buffer 253, and second ASB protocol interface 251. ASB protocol device 115 then responds through second ASB protocol interface 251, second read buffer 253 (for a read transaction), and second PCI protocol interface 255. Refer also to the prior discussion provided in conjunction with FIG. 2.

The present invention thus provides a device and method that enable PCI devices and ASB devices to communicate with each other. The present invention also provides a device and method that permit sufficient flexibility in the design of the system architecture to accommodate multiple standard buses as well as the required structure of master and slave devices. It is understood that the present invention can be modified to utilize protocols other than ASB and PCI. System architectures employing the present invention are able to effectively utilize the uni-directional embodiment of the present invention. The uni-directional embodiment is comprised of fewer components (e.g., gates) and is thus easier to simulate and design. It is also less costly because it requires less silicon surface area.

The preferred embodiment of the present invention, multiple standard bus architecture, is thus described. While the present invention has been described in particular embodiments, it should be appreciated that the present invention should not be construed as limited by such embodiments, but rather construed according to the following claims.

What is claimed is:

1. A bus bridge device for enabling communication between a first device and second device, wherein said first device is based on advanced microcontroller bus architecture advanced system bus (ASB) protocol and said second device is based on peripheral component interconnect (PCI) protocol, said first device coupled to said bus bridge device via an ASB protocol system bus and said second device coupled to said bus bridge device and to a memory via a PCI protocol bus, said bus bridge device comprising:

a first ASB protocol interface coupled to said first device, said first ASB protocol interface adapted to transmit a response to and receive a transaction from said first device;

a first PCI protocol interface coupled to said second device, said first PCI protocol interface adapted to transmit a transaction to and receive a response from said second device;

said first ASB protocol interface coupled to said first PCI protocol interface;

said first ASB protocol interface adapted to forward said transaction from said first device to said first PCI protocol interface and to execute said response from said second device on said ASB protocol system bus;

said first PCI protocol interface adapted to forward said response from said second device to said first ASB protocol interface; and control logic coupled to the first ASB protocol interface and to the first PCI protocol interface;

wherein said bus bridge is adapted to store and collate data and transaction information therein, and the control logic is adapted to temporarily stop an ASB transaction until the second device is finished accessing the memory.

2. The bus bridge device of claim 1, wherein said first PCI protocol interface is adapted to execute said transaction from said first device on a PCI bus.

3. The bus bridge device of claim 1 further comprising:

a first write buffer coupled between said first ASB protocol interface and said first PCI protocol interface, said first write buffer for storing write data received from said first device; and a first read buffer coupled between said first ASB protocol interface and said first PCI protocol interface, said first read buffer for storing said read data received from said second device.

4. The bus bridge device of claim 1, wherein said bus bridge device further comprises:

a second ASB protocol interface coupled to said first device, said second ASB protocol interface adapted to transmit a transaction to said first device;

a second PCI protocol interface coupled to said second device, said second PCI protocol interface adapted to received a transaction from said second device;

said second ASB protocol interface coupled to said second PCI protocol interface;

said second ASB protocol interface adapted to translate a transaction from said second PCI protocol interface to said ASB protocol; and said second PCI protocol interface adapted to forward said transaction from said second device to said second ASB protocol interface.

5. The bus bridge device of claim 1, wherein said first device is an ASB master device.

6. The bus bridge device of claim 4, further comprising:

a second write buffer coupled between said second ASB protocol interface and said second PCI protocol interface, said second write buffer for storing write data received from said second device; and a second read buffer coupled between said second ASB protocol interface and said second PCI protocol interface, said second read buffer for storing read data received from said first device.

7. The bus bridge device of claim 4, wherein said bus bridge device is adapted to defer a first transaction in favor of a second transaction such that a deadlock condition will not occur.

8. The bus bridge device of claim 5, wherein said ASB master device is an advanced RISC microprocessor (ARM processor).

9. A computer system comprising:

a memory interface coupled to a memory;

an advanced system bus (ASB) protocol bus coupled to said memory interface;

a bus bridge device coupled to said ASB protocol bus;

an ASB protocol device coupled to said bus bridge device, wherein said ASB protocol device is a master device coupled to said bus bridge device by said ASB protocol bus;

a peripheral component interconnect (PCI) protocol device coupled to said bus bridge device, and further coupled to the memory interface;

said bus bridge comprising:

a first ASB protocol interface coupled to said ASB protocol device, said first ASB protocol interface adapted to transmit a response to and receive a transaction from said first device;

a first PCI protocol interface coupled to said PCI protocol device, said first PCI protocol interface adapted to transmit a transaction to and receive a response from said PCI protocol device;

said first ASB protocol interface coupled to said first PCI protocol interface;

said first ASB protocol interface adapted to forward said transaction from said ASB protocol device to said first PCI protocol interface;

said first PCI protocol interface adapted to forward said response from said PCI protocol device to said first ASB protocol interface; and control logic coupled to the first ASB protocol interface and to the first PCI protocol interface;

wherein said bus bridge is adapted to store and collate data and transaction information therein, and the control logic is adapted to temporarily stop an ASB transaction until the PCI protocol device is finished accessing the memory.

10. The computer system of claim 9, wherein said PCI protocol device is coupled to said bus bridge device by a PCI bus, and wherein said PCI bus is coupled to said memory interface.

11. The computer system of claim 9 wherein said first ASB protocol interface is adapted to execute said response from said PCI protocol device on an ASB bus.

12. The computer system of claim 9 wherein said first PCI protocol interface is adapted to execute said transaction from said ASB protocol device on a PCI bus.

13. The computer system of claim 9 wherein said bus bridge further comprises:

a first write buffer coupled between said first ASB protocol interface and said first PCI protocol interface, said first write buffer for storing write data received from said ASB protocol device; and a first read buffer coupled between said first ASB protocol interface and said first PCI protocol interface, said first read buffer for storing read data received from said PCI protocol device.

14. The computer system of claim 9, wherein said bus bridge device is adapted to defer a first transaction in favor of a second transaction such that a deadlock condition will not occur.

15. The computer system of claim 9, wherein said ASB protocol device is an advanced RISC microprocessor (ARM processor).

16. The computer system of claim 9, wherein said first write component and said first read component use a first-in first-out process.

17. In a computer system having a memory interface coupled to a memory, a bus coupled to said memory interface, a bus bridge device coupled to said bus, an advanced system bus (ASB) protocol device coupled to said bus bridge device, and a peripheral component interconnect (PCI) protocol device coupled to said bus bridge device, a method for enabling communication between said ASB protocol device and said PCI protocol device, said method comprising:

a) receiving a transaction from said ASB protocol device at an ASB protocol interface in said bus bridge device;

b) translating said transaction from said ASB protocol to said PCI protocol;

c) forwarding said transaction to said PCI protocol device via a PCI protocol interface in said bus bridge device;

storing and collating transaction information within said bus bridge; and temporarily stopping said ASB transaction until the PCI protocol device is finished accessing the memory.

18. The method as recited in claim 17 wherein step c) further comprises the steps of:

c1) storing write data of said transaction in a write buffer coupled between said ASB protocol interface and said PCI protocol interface; and c2) forwarding said write data from said write buffer using a first-in first-out process.

19. The method as recited in claim 17 further comprising the steps of:

d) receiving a transaction response from said PCI protocol device via said PCI protocol interface;

e) translating said transaction response from said PCI protocol to said ASB protocol; and f) forwarding said transaction response to said ASB protocol device via said ASB protocol interface.

20. The method as recited in claim 17 wherein said ASB protocol device is an advanced RISC microprocessor (ARM processor).

21. The method as recited in claim 19 wherein step f) further comprises the steps of:

f1) storing read data of said transaction response in a read buffer coupled between said ASB protocol interface and said PCI protocol interface; and f2) forwarding said read data from said read buffer using a first-in first-out process.

22. A computer system comprising:

a memory system interface coupled to a memory;

a peripheral component interconnect (PCI) bus coupled to said memory interface;

a bus bridge device coupled to said PCI bus;

an advanced system bus (ASB) protocol advanced RISC microprocessor (ARM processor) coupled to said bus bridge device;

a peripheral component interconnect (PCI) protocol device coupled to said bus bridge device by said PCI bus;

said bus bridge device comprising:
- a first ASB protocol interface coupled to said ARM processor, said first ASB protocol interface adapted to transmit a response to and receive a transaction from said ARM processor;
- a first PCI protocol interface coupled to said PCI protocol device, said first PCI protocol interface adapted to transmit a transaction to and receive a response from said PCI protocol device;
- said first ASB protocol interface coupled to said first PCI protocol interface;
- said first ASB protocol interface adapted to forward said transaction from said ARM processor to said first PCI protocol interface;
- said first PCI protocol interface adapted to forward said response from said PCI protocol device to said first ASB protocol interface; and
- control logic coupled to the first ASB protocol interface and to the first PCI protocol interface;
- wherein said bus bridge is adapted to store and collate data and transaction information therein, and the control logic is adapted to temporarily stop an ASB transaction until the PCI protocol device is finished accessing the memory.

\* \* \* \* \*